(12) United States Patent
Nielsen

(10) Patent No.: US 7,456,515 B2
(45) Date of Patent: Nov. 25, 2008

(54) WIND TURBINE FOR USE OFFSHORE

(75) Inventor: Finn Gunnar Nielsen, Bønes (NO)

(73) Assignee: Norsk Hydro ASA, Olso (NO)

( * ) Notice: Subject to any disclaimer, the term of this patent is extended or adjusted under 35 U.S.C. 154(b) by 0 days.

(21) Appl. No.: 10/569,282

(22) PCT Filed: Aug. 20, 2004

(86) PCT No.: PCT/NO2004/000251

§ 371 (c)(1), (2), (4) Date: Sep. 14, 2006

(87) PCT Pub. No.: WO2005/021961

PCT Pub. Date: Oct. 3, 2005

(65) Prior Publication Data

US 2007/0040388 A1    Feb. 22, 2007

(30) Foreign Application Priority Data

Aug. 27, 2003   (NO) .................................. 20033807

(51) Int. Cl.
*F03D 11/04* (2006.01)
(52) U.S. Cl. ........................................................ 290/55
(58) Field of Classification Search ................. 290/55
See application file for complete search history.

(56) References Cited

U.S. PATENT DOCUMENTS

| | | | |
|---|---|---|---|
| 7,075,189 B2 * | 7/2006 | Heronemus et al. ........... | 290/44 |
| 7,156,037 B2 * | 1/2007 | Borgen ....................... | 114/264 |
| 2003/0170123 A1 | 9/2003 | Heronemus | |

FOREIGN PATENT DOCUMENTS

| | | | |
|---|---|---|---|
| DE | 3107252 | | 9/1982 |
| DE | 197 44 174 | | 4/1999 |
| DE | 19744174 A1 | * | 4/1999 |
| DE | 10113409 A1 | * | 10/2002 |
| ES | 2182702 A1 | * | 3/2003 |
| GB | 2378679 | | 2/2003 |
| JP | 56106071 A | * | 8/1981 |
| JP | 61-263892 | | 11/1986 |
| RU | 2173280 C2 | * | 9/2001 |
| SU | 1668717 A1 | * | 8/1991 |
| WO | 01/34977 | | 5/2001 |
| WO | 02/10589 | | 2/2002 |
| WO | 02/052150 | | 7/2002 |
| WO | 03/004869 | | 1/2003 |
| WO | 03/076800 | | 9/2003 |
| WO | 03/098038 | | 11/2003 |
| WO | WO 2004097217 A1 | * | 11/2004 |

* cited by examiner

*Primary Examiner*—Joseph Waks
(74) *Attorney, Agent, or Firm*—Wenderoth, Lind & Ponack, L.L.P.

(57) ABSTRACT

A procedure and a device in connection with the use of a wind turbine offshore, including a wind turbine (2) connected via a shaft to a generator (3), which is rotationally mounted on a tower (4), and a foundation underneath in the form of a float (6) on which the tower (4) is mounted. The float is anchored so that it can move freely in the vertical plane via an anchor or a mooring in the form of mooring lines, hinges or tethers (7). As a consequence of the effect of the waves on the float, the motion of the wind turbine will act as a damping mechanism on the motion and thus extract energy from the waves. The wind turbine's resonance period can be adjusted by adjusting the platform's center of gravity and/or the tension in the anchor with which the wind turbine is attached to the sea bed.

12 Claims, 6 Drawing Sheets

Fig. 4 *(Typical output of a wind turbine as a function of wind speed)*
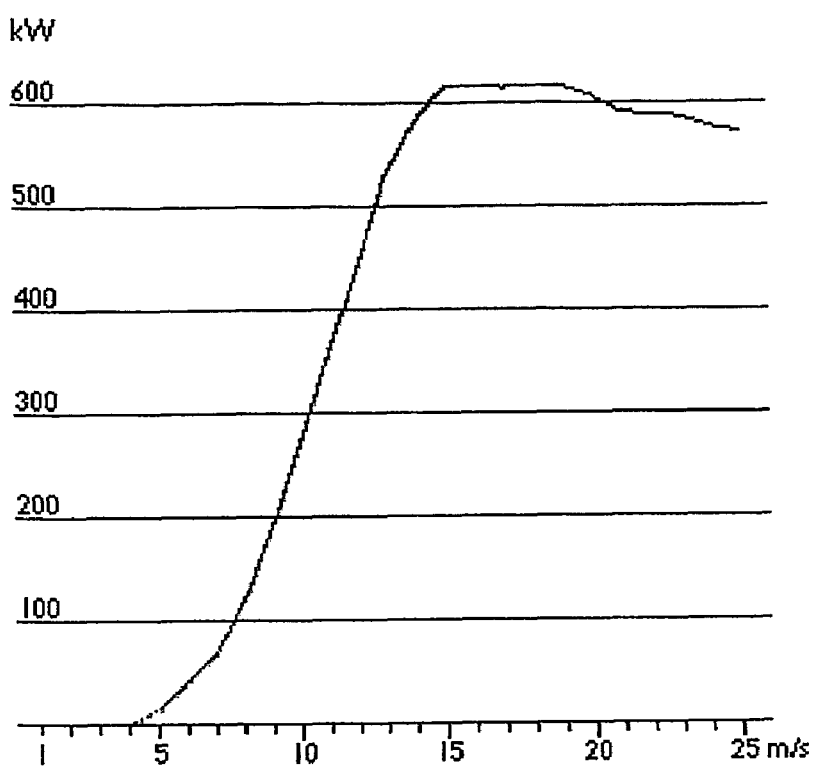

Fig. 5 *(Consequence on energy production by including wave power. Black solid line: wind energy only. Broken line: wind plus wave energy)*
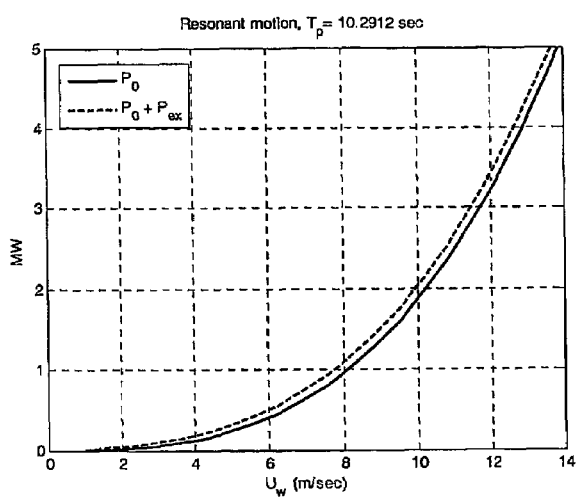

Fig. 6 *(Consequence on energy production by including wave power. Black line: Ratio between energy produced from wind + waves and energy produced from windalone. Red line: Proportion of the theoretical maximum wave energy exploited. Dotted line: wave amplitude used. Radius of rotor: 40 m. Foundation radius: 6 m. Draught: 60 m.*
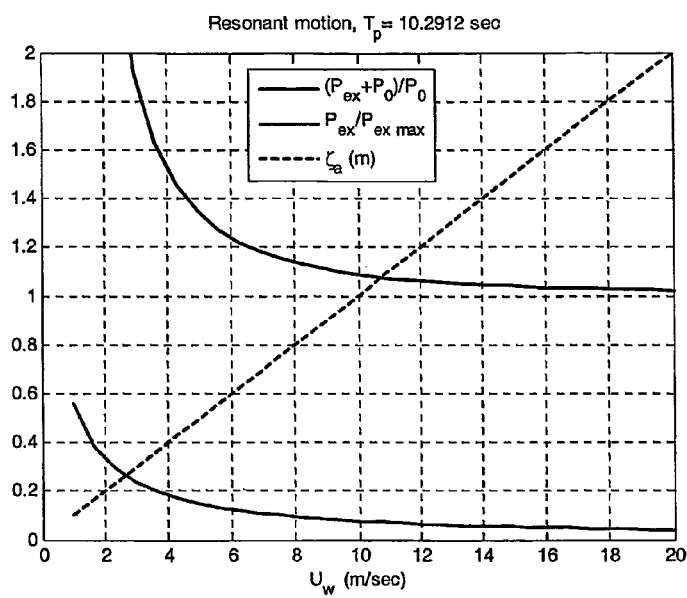

Fig 7. (Pitch response in waves with and without interaction between wind and waves)
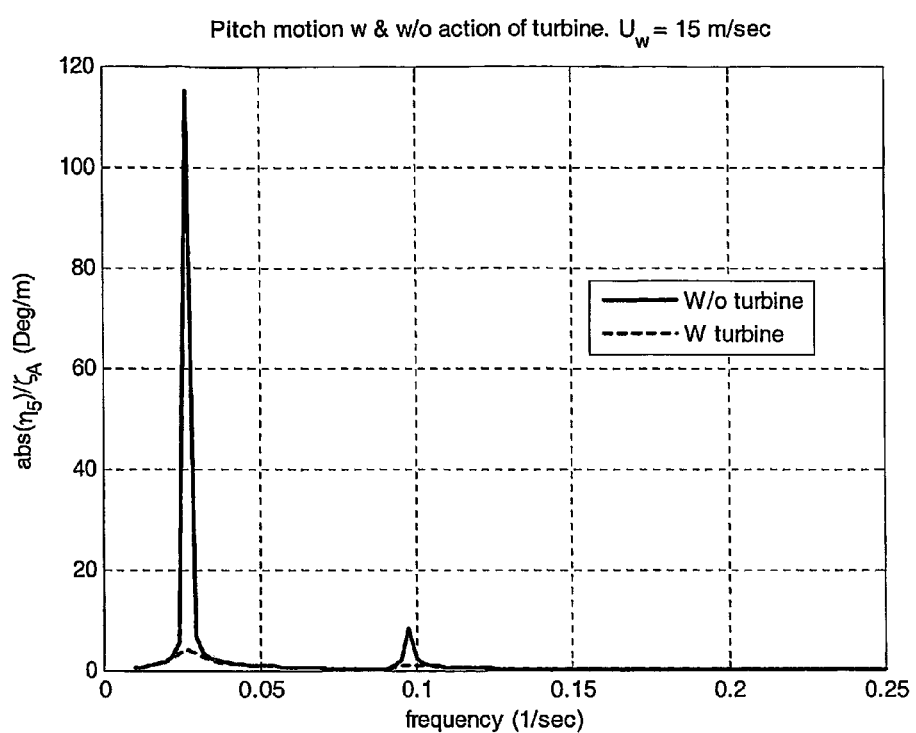

WIND TURBINE FOR USE OFFSHORE

BACKGROUND OF THE INVENTION

1. Technical Field

The present invention concerns a method and a device in connection with the use of a wind turbine offshore, comprising a wind turbine connected via a shaft to a generator, which is rotationally mounted on a tower, and a foundation underneath in the form of a float or buoyancy element on which the tower is mounted.

2. Description of the Related Art

Wind turbines are increasingly being installed offshore, partly on account of space requirements and also to achieve optimally constant, exploitable wind conditions (higher mean speed, lower turbulence, thinner interface than on land). At present, they are mainly installed in shallow water where they can easily be placed on a foundation that stands on the sea-bed. Such installations require that sufficient shallow water areas are available. Along most of the coasts of the world and particularly along the coast of Norway, the water is generally too deep to allow wind turbines to be installed on the sea bed. The installation of wind turbines in shallow water can also cause problems for the vessels that are to carry out the installation. Most installation vessels will have a draught that is too great to allow them to operate in depths up to 10 m.

For these reasons, the use of floating supporting structures is a relevant solution. To make this financially interesting, each turbine must have a high capacity, for example in the order of 5 MW. With such a large output and by exploiting the wind properties offshore, it is expected that floating supporting structures will be able to compete on energy price with land-based installations.

The prior art concepts for floating supporting structures are usually based on a single floating structure (for example a vertical column) that is anchored to the sea bed by means of vertical stays (tethers). Other hull concepts are based on the technology for semi-submersible platforms. These have been specially developed to have favorable (small) motions in waves. A common feature of most of the prior art wind turbine concepts is that the aim is to restrict the motion of the platform as much as possible. Moreover, they are designed so that they can withstand extreme sea conditions. The stricter the requirements made for the motion, the greater the forces experienced in an extreme situation. The combinations of these requirements are therefore expensive and contribute to prior art sea-based wind turbine solutions generally being unprofitable to date.

SUMMARY OF THE INVENTION

The present invention represents a method and a device in connection with an offshore-based wind turbine solution in which the mounting is simple and inexpensive, but which, at the same time, will be able to extract wave energy in addition to the wind energy The method and the device in accordance with the present invention are characterised in that the float is anchored with mooring lines or stays (tethers) or is hinged to the sea bed, and, as a consequence of the effect of the waves on the float, the motion of the wind turbine will act as a damping mechanism for the motion and thus extract energy from the waves.

By exploiting the motion of the platform in the waves, the wind turbine will be able to produce more energy. This energy is thus extracted from the waves. The wind turbine will thus act as a damping mechanism for the motion and thus extract energy that would otherwise have been wasted. Both the pitch and sway motions will contribute in this process.

How much energy that can be extracted from the waves is dependent on several factors such as the design of the float (hull) or buoyancy element, mooring characteristics and mass distribution, i.e. the dynamic properties of the float. Further, the amount of energy extracted from the waves is dependent on how the blades of the wind turbine are controlled in relation to the instantaneous relative velocity of the wind, i.e. the pitch control of the wind turbine blades. If the pitch is kept constant, the thrust and power coefficients are approximately constant. On the other hand, if the pitch is controlled such that the thrust and power coefficients increase with increasing relative wind velocity, then the energy absorption from the waves will increase.

The maximum energy will be extracted from the waves if the system oscillates in resonance with the waves. By designing the system such that the radiation damping is equal to the linearized damping form the wind turbine, the maximum theoretical energy absorption is achieved. (The radiation damping is the damping that causes the creation of out-going waves in water when a structure is moving.)

The radiation damping is influenced by the geometrical design of the float or buoyancy element. It is mainly a function of the radius of the float. At a given frequency, the radiation damping in pitching (at head sea) is proportional to the fourth power of the radius of the float. The damping of the turbine is dependent on the average wind velocity, the radius of the turbine and the thrust coefficient.

However, energy can also be extracted from the waves when the float is oscillating at non-resonant frequencies. The resonance period in pitching can be adjusted, for example by pumping ballast into and out of a tank. This will make it possible to adjust the center of gravity of the platform and/or the tension in the tether. The tether, tension will affect the resonance period for the system.

At low wind velocities in particular, when the turbine's rated power production is not achieved by the wind alone, the interaction with waves will induce additional energy production.

At high wind speeds (and correspondingly high waves), it will be possible to adjust the system's natural period to avoid resonance and thus reduce motion. This will also make it possible to reduce the maximum loads on the system.

BRIEF DESCRIPTION OF THE DRAWINGS

The present invention will be described in further detail in the following using examples and with reference to the figures, where:

FIGS. 4-7 show various curves associated with the output of the wind turbine, with and without the effect of waves, based on theoretical calculations.

DETAILED DESCRIPTION OF THE INVENTION

Figure 1:
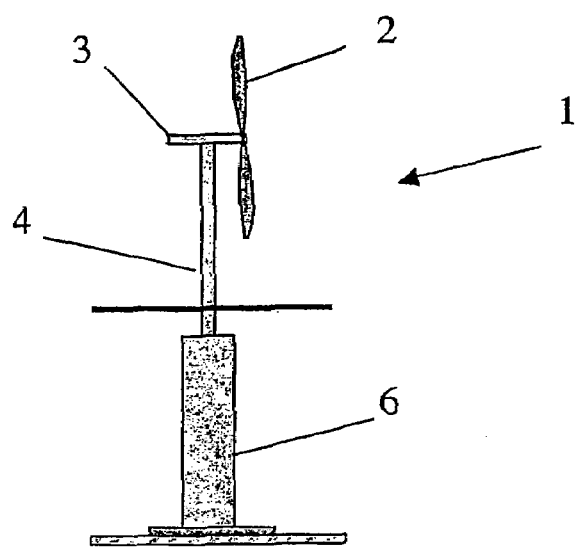
FIG. 1 shows a simple schematic diagram of a prior art wind turbine placed on the sea bed.
Figure 2:
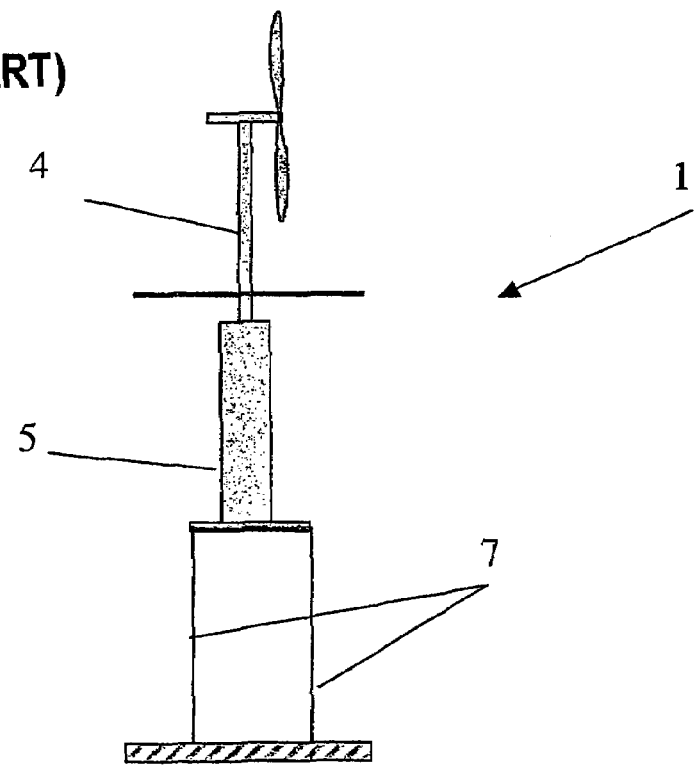
FIG. 2 shows a simple schematic diagram of a prior art floating wind turbine moored to the sea bed.
Figure 3:
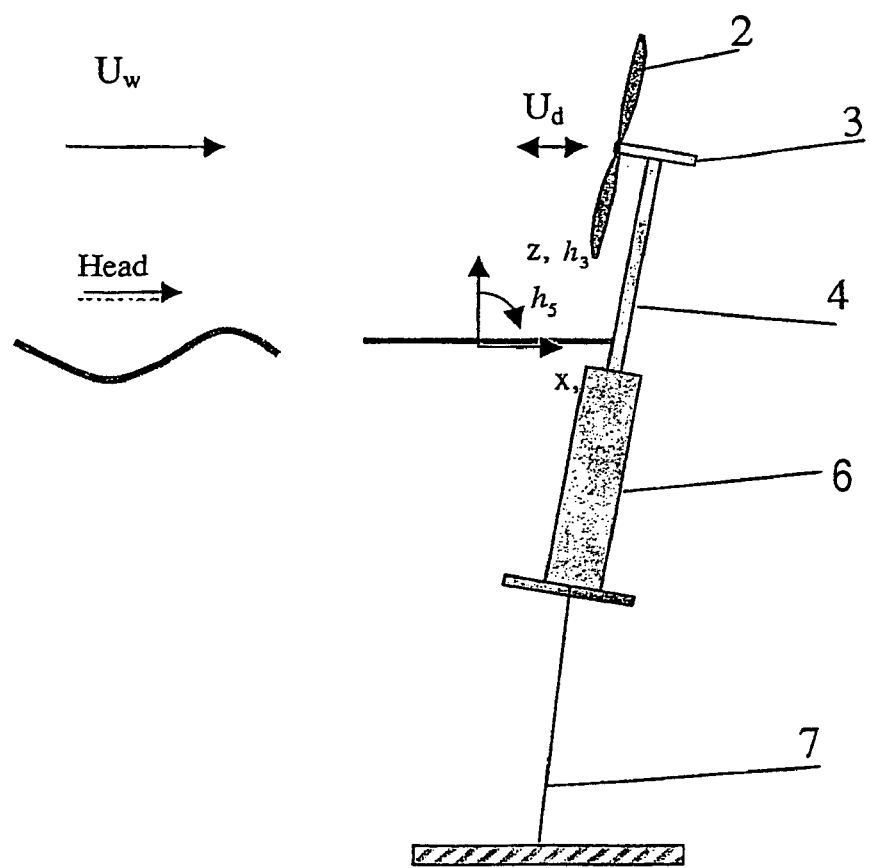
FIG. 3 shows a simple schematic diagram of a wind turbine in accordance with the present invention, which is free to move in sway and pitch motion.

A wind turbine 1 comprises, in rough outline as shown in FIGS. 1-3, a wind turbine 2 connected via a shaft (not shown) to a generator 3, which is rotationally mounted on a tower 4, and a supporting structure 5, 6, on which the tower is mounted. FIG. 1 shows a traditional wind turbine in which the tower 4 is mounted on a fixed structure 5 on the sea bed, while FIG. 2 shows a similar traditional wind turbine in which the tower is mounted on an immersed float or buoyancy device 6 that is anchored to the sea bed via mooring lines 7 and consequently has very small motions.

As indicated above, the present invention is based on the theory that if the foundation is allowed to have positive buoyancy, and relatively high motion in the horizontal plane is accepted, the mooring can be made simpler and the structure probably less costly, while it also offers the potential for increased energy production. In particular, such a solution will be able to produce greater output in situations with a moderate wind. If it is assumed that the waves generally come in the same direction as the wind, the wind turbine will move forwards and backwards due to the motion of the foundation (float) as shown in FIG. 3. This will result in a periodic motion of the wind turbine, alternately with and against the wind. As the power output of the turbine is roughly proportional to the cube of the relative speed between the wind turbine and the air. This is valid for turbines with fixed pitch, however, the exponent will vary for turbines with variable pitch. This may either increase or reduce energy extraction from the waves, depending upon the regulation strategy. This will result in additional energy production. This additional energy is taken from the waves.

The theoretical basis of the idea shows how the interaction between the wind and waves provides both increased energy production and reduced wave induced movements relative to the movements without such interaction. Maximum power from the waves is achieved when the resonance is exploited and when the damping due to wave diffraction is "tuned" to the damping due to the wind turbine. However, it should be added that resonance is not a requirement for the principle to work.

It seems inappropriate to go into the fundamental theoretical assessments and calculations with regard to the present invention. In the following, therefore, examples illustrating the present invention will just be shown.

To explain the present invention in further detail, it is easiest to assume a floating wind turbine in which the float or foundation consists of a vertical cylinder with a constant diameter as shown in FIG. 3. By adjusting the buoyancy, the weight and the position of the center of gravity, it is possible to make the system move in resonance in virtually pure rotational motion (pitch) around a point between the water line and the sea bed. In theory, it is possible to show how much energy it is possible to extract from the waves and that it is optimal to have damping on account of the turbine effect that is equal to the damping from waves (this applies when there is resonance). The stay in the drawing shown in the figure may, in moderate depths of water, be replaced by a hinged connection between the platform and the sea bed. Alternatively, more conventional chain line anchoring may be used.

The maximum mean output that can then be extracted from the waves at resonance is given by:

$$\overline{P}_{ex} = 3 \frac{rg^3 z_A^2}{w^3} \frac{B_{55}^{(r)} B_t^{(r)}}{(B_{55}^{(r)} + B_t^{(r)} + B_{add}^{(r)})^2} \frac{C_P}{C_T}$$

Where r (rho) is the density of the water, g is the acceleration of gravity, $\zeta_A$ (Zeta) is the wave amplitude (regular monochromatic waves), w (omega) is the wave frequency, assumed to be equal to the natural frequency of the pitch in this example, $B_{55}^{(r)}$ is the wave radiation damping in connection with resonance for the pitch motion, $B_t^{(r)}$ is the damping of the pitch motion on account of the wind force on the turbine and $B_{add}^{(r)}$ is the additional damping on account of, for example, the wind force on the tower and viscous forces in the water. $C_P$ and $C_T$ are respectively the power coefficient and thrust coefficient for the wind turbine. The damping due to the wind force on the turbine is given by:

$$B_t^{(r)} = C_P \eta_a \pi R^2 (z_a - z_r)^2 U_w$$

The turbine's wind power coefficient $C_p$ has a theoretical maximum value of 16/27. The corresponding value of the $C_T$ coefficient is 8/9. $\eta_a$ is the density of the air, R is the diameter of the rotor, $(z_a - z_r)$ is the distance from the center of the rotor to the center of the pitch motion and $U_w$ is the wind speed onto the rotor. The maximum theoretical effect from the waves is achieved if $B_{add}^{(r)} = 0$ and $B_{55}^{(r)} = B_t^{(r)}$. This maximum effect is given by:

$$\overline{P}_{ex,max} = \frac{3}{4} \frac{rg^3 z_A^2}{w^3}$$

FIG. 4 shows a typical output curve for a land-based wind turbine of moderate size (600 kW). As the figure shows, this turbine only achieves maximum output at a wind speed of approximately 15 m/s and above. Offshore-based turbines will usually be designed for higher wind speeds. By utilizing the system's dynamic properties actively, it will be possible to extract more energy at wind velocities of less than approximately 15 m/s.

FIG. 5 shows a specific example of how much additional output can be achieved from a turbine at various wind speeds. The broken curve shows the output achieved by exploiting both wind and waves. The solid line shows the output when just wind is exploited. In this example, a foundation with a radius of approximately 7 m and a draught of 120 m is used. The rotor of the turbine has a radius of 40 m. This is equivalent to an offshore turbine with an output in the order of 5 MW. The system has a pitch natural period of approximately 10 seconds. In the example, it is assumed that the wave amplitude is proportional to the wind speed (0.5 meters wave amplitude at 5 m/s wind speed, increasing to 2 meters wave amplitude at 20 m/s wind speed) and that the system oscillates in resonance at approximately 10 seconds.

FIG. 6 shows the relative increase in output from exploiting both wind and waves in relation to just wind (the black lines). At 6 m/s more than 25% extra power output is achieved when exploiting the wave energy in addition to the wind, compared to exploiting the wind alone. The solid lines show how much of the wave power is extracted in relation to the theoretical maximum. For other details, please see the attachment. In this example constant (fixed) thrust and power coefficients are used. By using pitch control the power will increase.

A positive bi-effect of extracting energy from the waves is that the motions of the system are reduced. In FIG. 7 is shown the angle of response in pitching per meter wave amplitude for the system described above. The wave frequency is varied from 0.02 Hz to 0.25 Hz. A constant wind velocity of 15 m/sec is used. The solid black line shows the response in waves without the interaction with the wind, while the broken line shows the response when the interaction is included.

It should be noted that the present invention as it is defined in the claims is not limited to the solution described above and shown in FIG. 3. The principle will also function for other geometries of the float than a vertical cylinder.

The invention claimed is:

1. A method of installing an offshore wind turbine comprising blades connected via a shaft to a generator, which is rotationally mounted on a tower, and a foundation underneath in the form of a float or hull on which the tower is mounted, the method comprising:

anchoring the float via an anchor line, tether or link to a sea bed so that it floats freely; and adjusting the resonance period of the wind turbine by adjusting the center of gravity of the wind turbine and/or tension in the anchor line, tether or link so that the wind turbine oscillates in resonance with the waves, wherein as a consequence of the effect of waves on the float, the motion of the wind turbine acts as a damping mechanism on the motion and thus extracts energy from the waves.

2. The method in accordance with claim 1, further comprising adjusting a resonance period in pitch of the wind turbine by pumping ballast into and out of a tank in the float.

3. The method in accordance with claim 2, further comprising controlling the pitch of the blades of the wind turbine in order to achieve a desired damping effect and thereby extract energy from the waves.

4. The method in accordance with claim 1, wherein the resonance period is changed by moving liquid or solid ballast vertically in the float or in the tower.

5. The method in accordance with claim 4, further comprising controlling the pitch of the blades of the wind turbine in order to achieve a desired damping effect and thereby extract energy from the waves.

6. The method in accordance with claim 1, further comprising controlling the pitch of the blades of the wind turbine in order to achieve a desired damping effect and thereby extract energy from the waves.

7. An offshore wind turbine comprising:

a wind turbine rotor connected via a shaft to a generator, the rotor being rotationally mounted on a tower;

a foundation underneath the tower in the form of a float on which the tower is mounted; and an anchor line, link or tether connected to the float so that the float can move freely in a vertical plane, wherein the center of gravity of the wind turbine and/or the tension in the anchor line is adjusted to adjust the resonance period of the wind turbine so that the wind turbine oscillates in resonance with the waves; and wherein, as a consequence of the effect of waves on the float, motion of the wind turbine acts as a damping mechanism on the motion and is thus able to extract energy from the waves.

8. The offshore wind turbine as claimed in claim 7, wherein the float includes a tank, and the resonance period of the wind turbine can be adjusted by pumping ballast into and out of the tank.

9. The offshore wind turbine as claimed in claim 8, wherein the blades of the wind turbine rotor can be adjusted in order to control blade pitch.

10. The offshore wind turbine as claimed in claim 7, further comprising liquid or solid ballast disposed in the float or in the tower, wherein the resonance period of the wind turbine can be adjusted by moving the liquid or solid ballast vertically in the float or the tower.

11. The offshore wind turbine as claimed in claim 10, wherein the blades of the wind turbine rotor can be adjusted in order to control blade pitch.

12. The offshore wind turbine as claimed in claim 7, wherein the blades of the wind turbine rotor can be adjusted in order to control blade pitch.

* * * * *